United States Patent [19]

Nilsen

[11] 4,210,183
[45] Jul. 1, 1980

[54] TREE CLAMP AND SHEAR SUPPORT STRUCTURE

[76] Inventor: Christopher Nilsen, 1101 W. Birch St., Shelton, Wash. 98584

[21] Appl. No.: 962,377

[22] Filed: Nov. 20, 1978

[51] Int. Cl.² .............................................. A01G 23/08
[52] U.S. Cl. ................................ 144/34 E; 144/3 D; 294/67 BC; 414/731
[58] Field of Search ................... 294/67 R, 67 BC, 88, 294/106; 144/2 Z, 3 D, 34 R, 34 E, 309 AC; 414/622, 731, 738, 739

[56] References Cited

U.S. PATENT DOCUMENTS

| | | | |
|---|---|---|---|
| 2,815,878 | 12/1957 | Vance | 294/67 BC |
| 3,074,446 | 1/1963 | Earl | 144/3 D |
| 3,102,562 | 9/1963 | Horncastle | 144/3 D |
| 3,238,981 | 3/1966 | Larson | 144/34 E |
| 3,527,272 | 9/1970 | Hamilton | 144/34 E |
| 3,540,501 | 11/1970 | Jonsson | 144/34 E |
| 3,572,411 | 3/1971 | Coughran, Jr. | |
| 3,640,322 | 2/1972 | Allen | 144/34 E |

FOREIGN PATENT DOCUMENTS 978449  11/1975  Canada .................................. 144/3 D

*Primary Examiner*—W. Donald Bray
*Attorney, Agent, or Firm*—Robert W. Beach; Ward Brown

[57] ABSTRACT

Conventional linkage projecting forward from a tractor, such as the linkage commonly used to support the bucket of a loader, carries a box frame for elevational movement and for tilting of the frame about a horizontal axis. Two sets of clamping grapple arms are mounted on cross members of the frame by upright pivot shafts extending between such cross members for swinging of the grapple arms. Jaws including shearing blades are mounted below the grapple arms between cross members of the frame for swinging about axes registered with the grapple arm axes. With the frame upright and the grapple arms and jaws open, the tractor is driven forward to embrace a standing tree between the grapple arms and the jaws. The grapple arms are closed to clamp the tree followed by closing the jaws to shear the tree, whereupon the tree, standing on the shearing blades, can be maneuvered in upright position to a piling or yarding area and swung downward by tilting the box frame forward.

11 Claims, 6 Drawing Figures

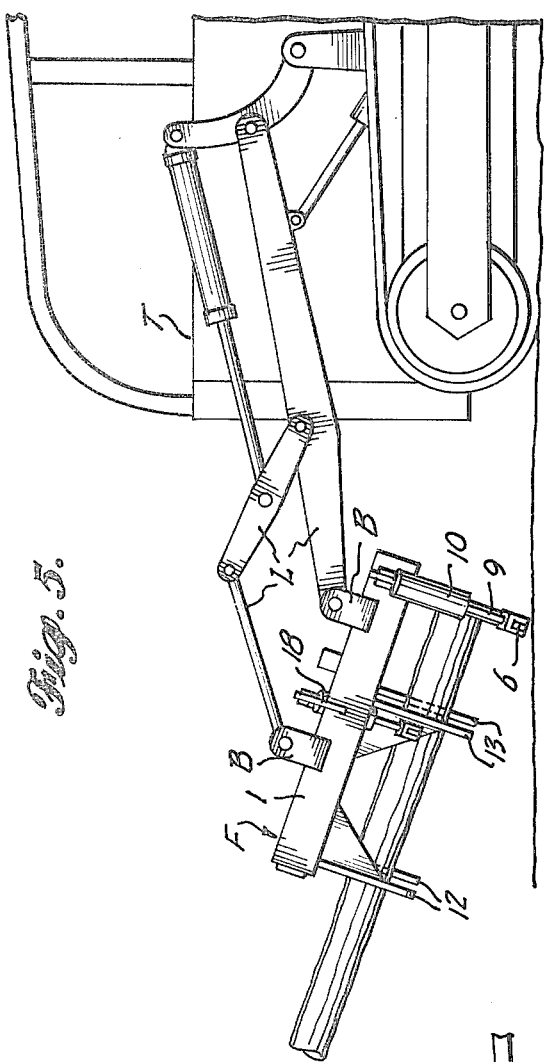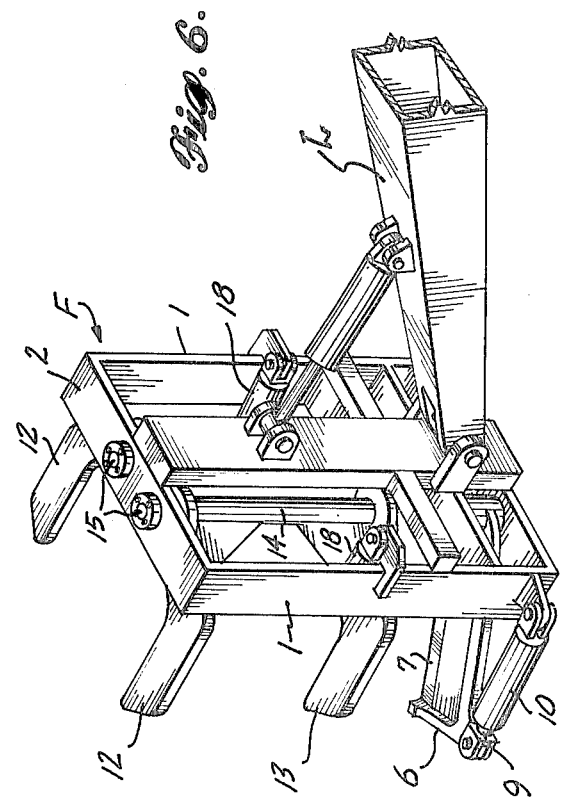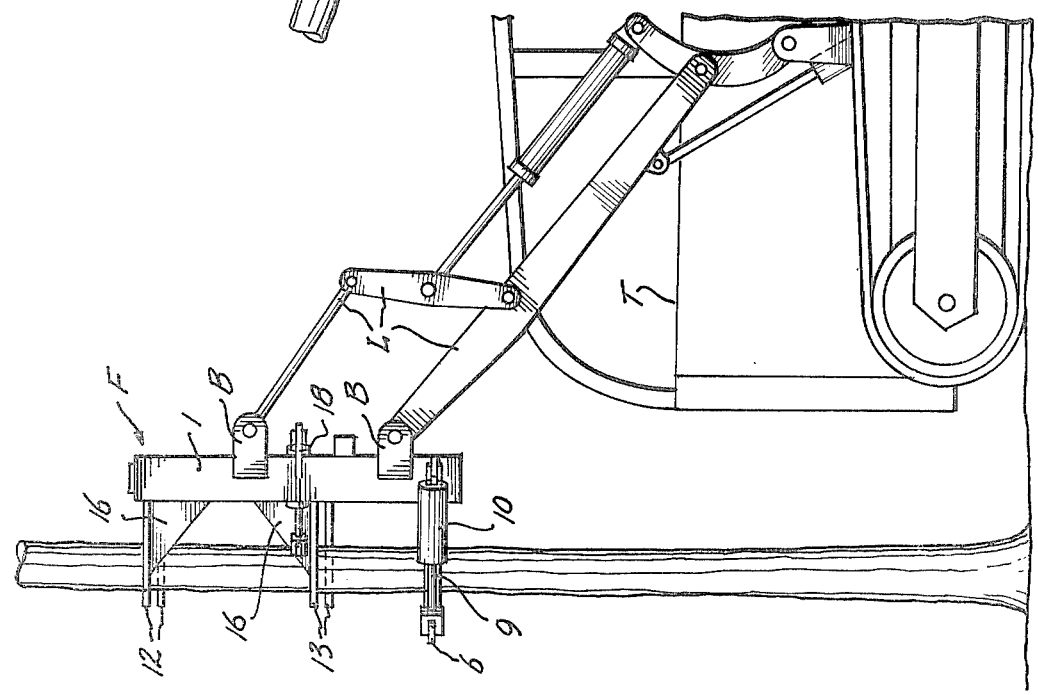

TREE CLAMP AND SHEAR SUPPORT STRUCTURE

BACKGROUND OF THE INVENTION

1. Field of the Invention

The present invention relates to mobile timber cutting and handling apparatus of the type using blades for shearing trees and grapple arms for clamping trees so that they can be moved in upright position to a piling or yarding area.

2. Prior Art

Horncastle U.S. Pat. No. 3,102,562 discloses "Tree Felling and Bunching Mechanism" including "gripping means for gripping an upright tree at its base" (column 1, line 47) and "sawing means for sawing through the trunk of a tree below the gripping means" (column 1, lines 49 to 50), each of such means being carried by a boom pivotally mounted on a tractor. In use, the tree-gripping mechanism is maneuvered to grip a standing tree, the tree is severed by the sawing mechanism and the gripping and sawing mechanism are tilted to lower the tree.

Earl U.S. Pat. No. 3,074,446 discloses a "Machine for Harvesting Trees" including an upright U-shaped "tree receiving jaw", "roller grippers" movable through apertures in the jaw to grip a tree and a chain saw swingably mounted at the lower end of the jaw. Support structure pivotally mounts the jaw on the side of a crawler tractor. In use, a standing tree is received in the jaw and gripped by the roller grippers, whereupon the chain saw is swung to sever the tree. The tree is swung downward and delimbed as the roller grippers move it lengthwise of the jaw.

In the "Apparatus for Harvesting Trees" of Larson et al. U.S. Pat. No. 3,238,981, tree-delimbing mechanism is movable vertically along an upright rail. Tree-severing mechanism, such as a chain saw, is swingably mounted at the bottom of the rail. The rail is mounted on a boom carried by a tractor.

Also known is the "Model TS-15 Feller-Buncher" manufactured by Allen Hydraulics Co. As shown in the operating manual, such feller-buncher includes grapple arms for clamping an upright tree and swingable jaws including shear blades for severing a tree, the grapple arms and jaws being swingably mounted on a tractor.

SUMMARY OF THE INVENTION

The principal object of the present invention is to provide improved support structure for mounting on a tractor mechanism for clamping and severing an upright tree.

More specifically it is an object to provide rugged mounting means for tree clamping and severing devices which cannot easily be twisted or bent by stresses exerted on such mounting means by striking, shearing or transporting heavy trees, yet which will be light and compact for its strength.

Such objects can be accomplished by providing a box frame having spaced side members and several cross members spaced lengthwise of, extending between and rigidly connecting such side members, and mechanism mounting tree-clamping and tree-severing devices on cross members between such side members.

In the preferred embodiment of the invention, at least four cross members are provided, including two upper cross members pivotally carrying grapple arms and two lower cross members pivotally carrying jaws including tree-shearing blades.

BRIEF DESCRIPTION OF THE DRAWINGS

FIG. 4 is a somewhat diagrammatic fragmentary side elevation of a tree clamp and shear having support structure in accordance with the present invention, and FIG. 5 is a corresponding side elevation with parts in different positions.

FIG. 6 is a fragmentary top perspective of tree clamp and shear support structure in accordance with the present invention modified for being mounted on a different type of tractor.

DETAILED DESCRIPTION

Timber-cutting and handling apparatus of the type with which the present invention is concerned includes mechanism for clamping a tree in upright position before, during and after severing the tree by opposing tree-shearing blades. Prior tree-clamping mechanism has included a set of elevationally spaced grapple arms swingable about an upright axis to clamp the tree against another set of stationary or swingable elevationally spaced grapple arms. As the tree is clamped, substantial reactive forces are applied to the grapple arm mountings. Similarly, when opposing shearing blades are used to sever the tree, substantial reactive forces are applied to the shearing blade mountings. In addition, the tree to be harvested may not be perfectly perpendicular to the ground, in which case twisting and racking forces are applied to the grapple arm mountings as the tree is clamped. Twisting and racking forces also are applied to the grapple arm mountings after the tree has been severed, as it leans in the direction in which it was tilting prior to being severed, as it may be blown by wind and as the top-heavy severed tree is maneuvered in upright position.

Prior swingable tree-clamping grapple arms and tree-shearing blades have been pivotally mounted on plates or lugs cantilevered from a central column. To withstand the forces applied to the grapple arm and blade mountings described above, heavy and bulky plates or lugs and a large, heavy central column have been used. Moreover, since the grapple arm and blade-supporting lugs and plates are cantilevered from the central column, that is, since support for the grapple arm and shearing blade mountings is not provided on both sides of such mountings, only fairly small trees can be harvested by the conventional apparatus. The mounting for the grapple arms and shear blades of the present invention provides much better support for these components and is lighter than conventional support structure.

Figure 1:
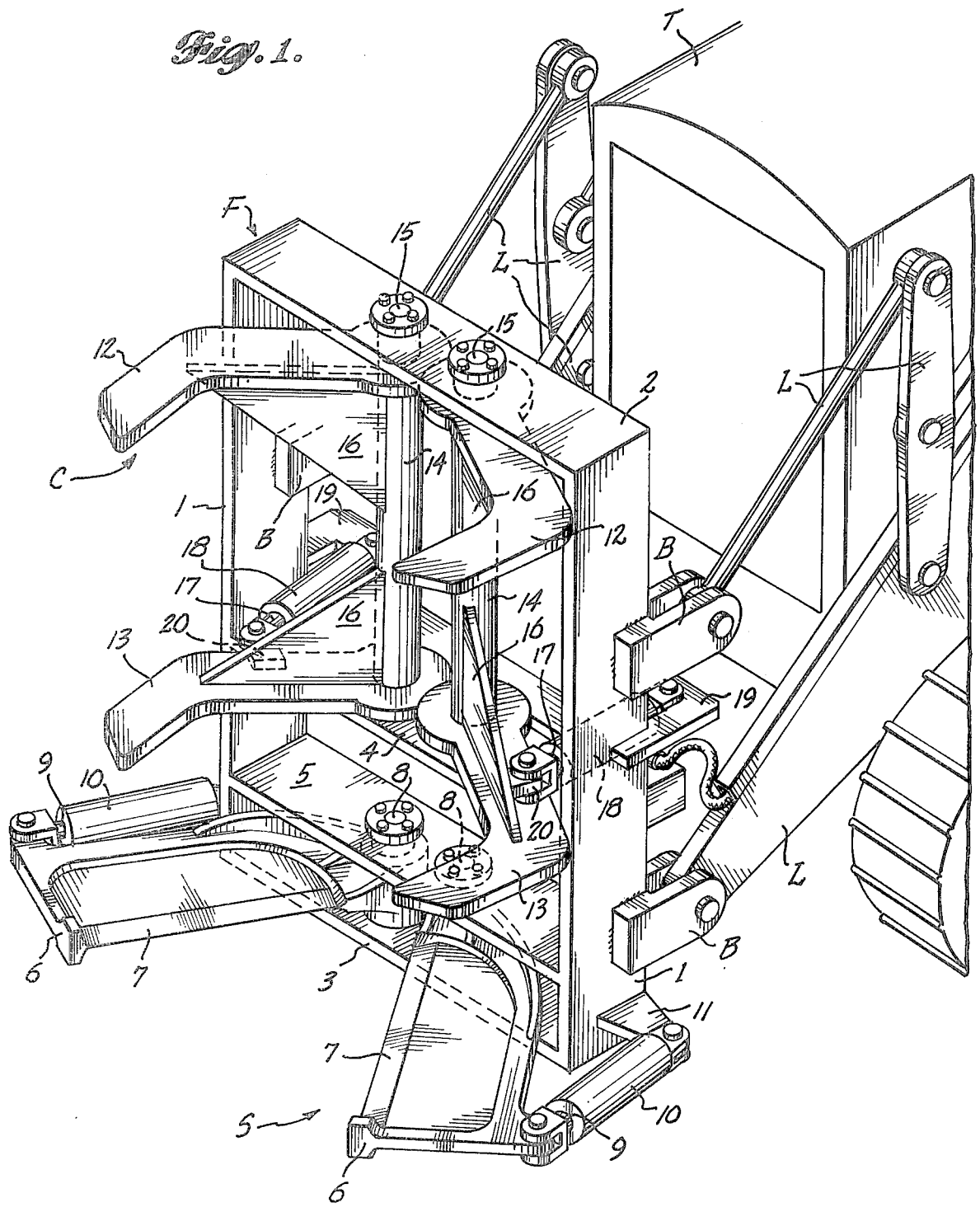
FIG. 1 is a fragmentary top perspective of tree clamp and shear support structure in accordance with the present invention mounted on a tractor.
Figure 2:
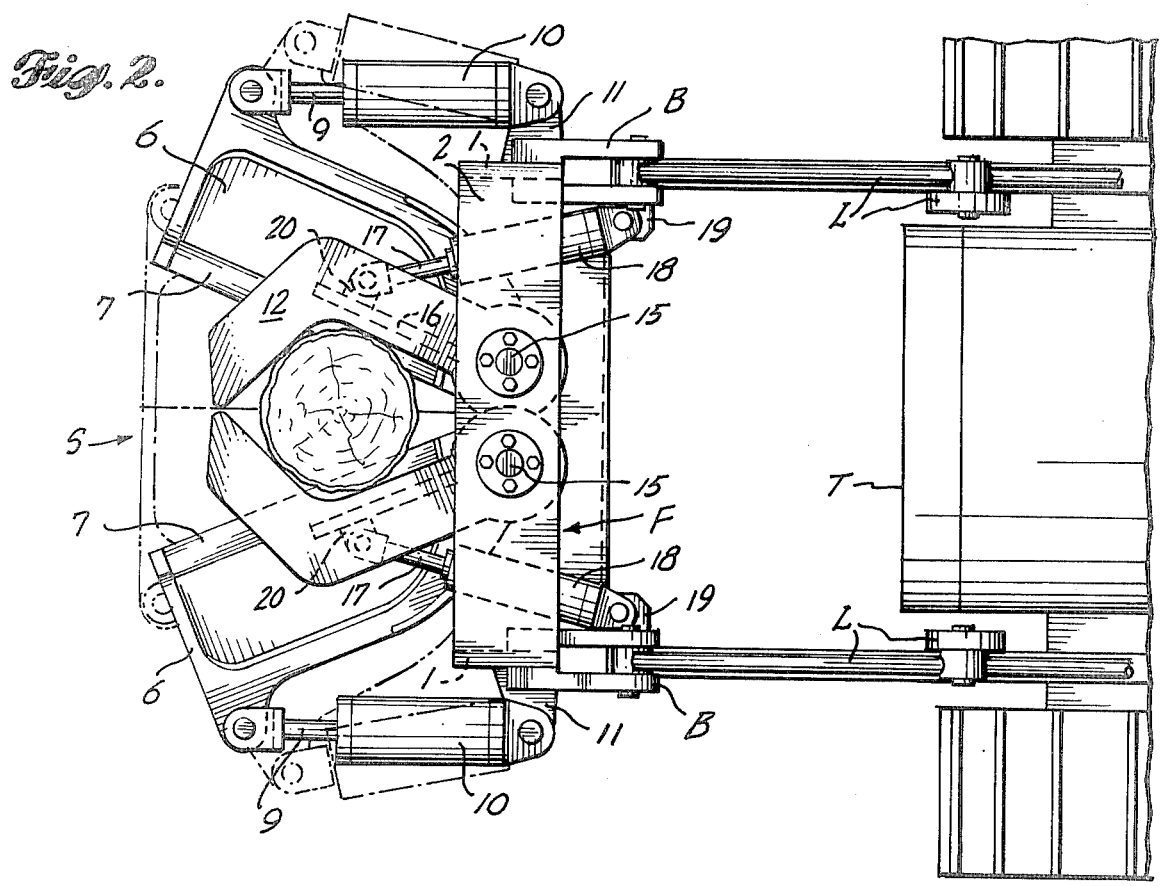
FIG. 2 is a somewhat diagrammatic fragmentary top plan of the tree clamp and shear support structure shown in FIG. 1.

As shown in FIG. 1, tree clamp and shear support structure in accordance with the present invention includes a box frame F pivotally carried by the conventional linkage L of a tractor T, such as the linkage commonly used to support the bucket of a loader. For example, rearward projecting brackets B can be welded to the spaced normally upright, preferably substantially parallel side members 1 of the frame and used to pivotally connect the frame to the tractor linkage. Such upright frame members preferably are elongated plates spaced apart a distance generally corresponding to the width of the tractor frame, as shown in FIG. 2, and having their broad faces parallel. Several frame cross members rigidly connect the side members 1, including an upper cross member 2 extending between the upper ends of the side members, a bottom cross member 3 extending between the bottom ends of the side members and elevationally spaced upper and lower cross members 4 and 5, respectively, extending between generally central portions of the side members. Such cross members also preferably are elongated plates having their broad faces parallel. The upright side members and the cross members preferably are in orthogonal relationship to form a rectangular frame.

In accordance with the present invention, tree-clamping mechanism C and tree-severing mechanism S are carried by the frame cross members between the frame side members. In the preferred embodiment of the invention shown in the drawings, the tree-severing mechanism includes two swingable jaws 6 projecting forward from the frame and having opposing tree-shearing blades 7. Each jaw is carried by an upright pivot shaft 8 extending lengthwise of the frame through cross members 3 and 5 and is swingable toward and away from the other jaw by extension of the plunger 9 of a hydraulic jack 10 pivotally connected to the outer portion of such jaw and reacting from a lug 11 projecting laterally outward from a frame side member 1.

The preferred form of tree-clamping mechanism C includes two sets of elevationally spaced hooked grapple arms projecting forward from the frame, each set including an upper grapple arm 12 and a lower grapple arm 13. In each set, the upper and lower grapple arms are carried by a sleeve 14 mounted on an upright pivot shaft 15 extending lengthwise of the frame and extending through cross members 2 and 4. The upright and horizontal edges of right triangular gussets 16 are welded, respectively, to a sleeve 14 and an arm 12 or 13 to support the arms rigidly from the sleeve. Each set of grapple arms can be swung toward and away from the other set of arms by extension of the plunger 17 of a hydraulic jack 18 pivotally connected to a lug 20 projecting rearward from one of the lower gussets 16 and reacting from a lug 19 projecting rearward from a frame side member 1.

As shown in FIG. 6, only slight modification of the frame F shown in FIGS. 1 through 5 is required to enable the modified frame to be attached to a single tractor linkage member L in the form of a boom swingably mounted on a tractor.

Figure 3:
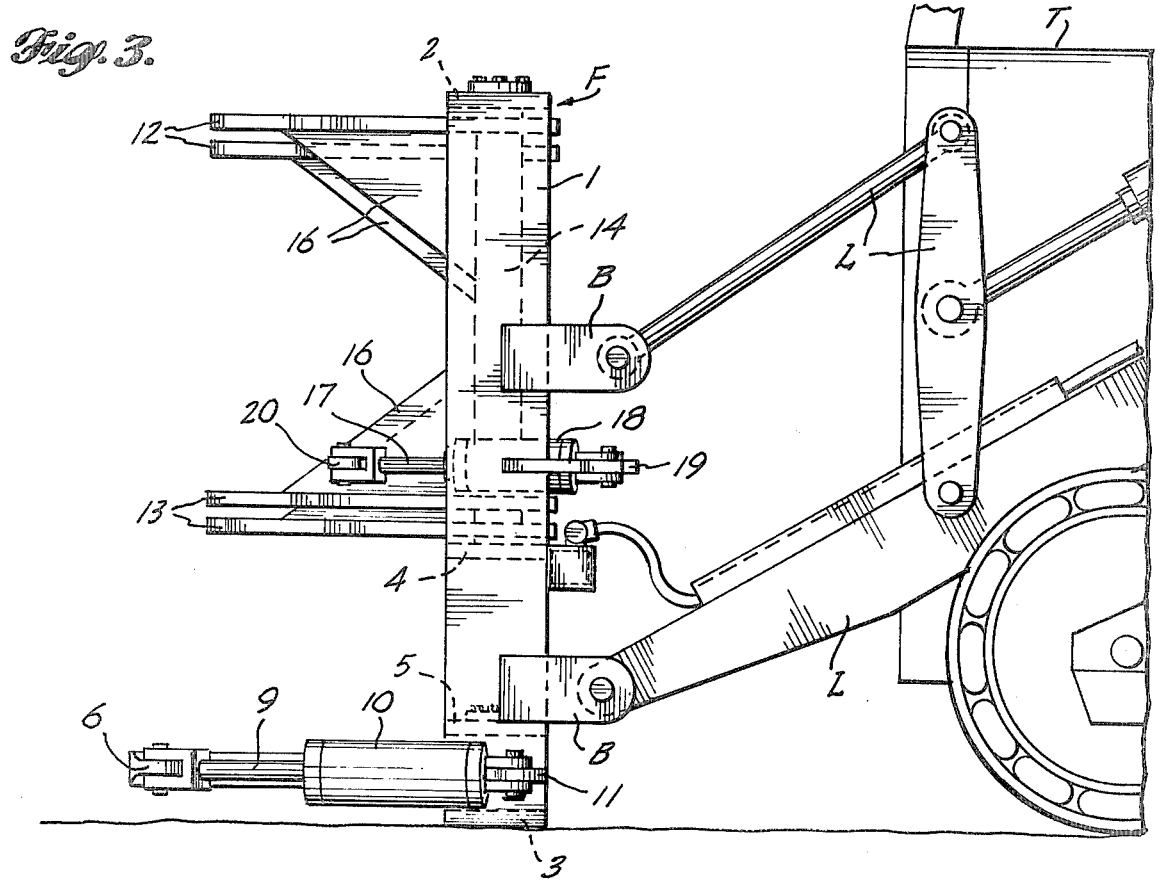
FIG. 3 is a fragmentary side elevation of such clamp and shear support structure.

In use, the grapple arms and jaws are opened and the tractor is maneuvered to position a standing tree centrally between the open arms and jaws. The tractor linkage can be manipulated to move the box frame carrying the arms and shearing blades elevationally without tilting them, such that the blades are positioned quite close to the ground as shown in FIG. 3 or a substantial distance above the ground as shown in FIG. 4. The grapple arms are closed to securely clamp the tree, drawing the tractor forward or pushing it rearward as the tree is centered in the arms. As shown in FIG. 3, the grapple arms of each set are offset elevationally relative to the grapple arms of the other set such that the outer ends of the arms will interdigitate when clamping a small diameter tree.

After the tractor-maneuvering and tree-clamping operation is completed, the jaws 6 are swung closed so that the shearing blades sever the tree. If desired, a single common hydraulic liquid supply line can be provided for the grapple arm jacks and jaw jacks, but, preferably, suitable flow-restricting mechanism is provided for the supply line to the jaw jacks, or such line is smaller than the line to the grapple arm jacks, to assure that the tree is clamped securely before the jaws are closed.

The severed tree rests on the closed shearing blades and is steadied by the grapple arms. In this position the upright tree can be maneuvered to a piling or yarding area, whereupon the tractor linkage is manipulated to tilt the box frame carrying the grapple arms and jaws forward, as shown in FIG. 5, to lower the tree. In lowered position, the tree can be skidded by moving the tractor, for example to align the butt of the tree with the butts of previously harvested trees. The grapple arms and jaws are then opened to release the tree.

The provision of a box frame for mounting tree-clamping and tree-severing mechanism on a tractor offers several advantages over conventional support structure, including easy fabrication of the frame and its adaptation for being pivotally mounted on the existing linkage of a conventional tractor because the upright side members 1 of the box frame are spaced apart a distance approximately equal to the width of the tractor frame. However, the principal advantage of tree clamp and shear support structure in accordance with the present invention is the formation of the clamp and shear mounting structure such that it is rigid and structurally efficient in withstanding the stresses reacting to the stresses created in the clamping and shearing devices by clamping a tree for felling, cutting such tree and thereafter carrying and handling the severed tree.

By mounting grapple arms and shearing blades on cross members between the side members of a box frame, each mounting is supported laterally on both sides. By mounting each set of grapple arms and each jaw on a single shaft journaled in longitudinally spaced cross members, reative stress is applied substantially equally to two cross members and twisting and racking of the frame is resisted effectively by the box frame sides spaced apart a considerable distance by the cross members connecting them. Consequently, support structure in accordance with the present invention for a machine for harvesting trees of a given size is considerably lighter than a conventional support structure for such a machine using a central column and cantilevered mounting plates or lugs.

I claim:

1. In support structure for mounting on a tractor grapple means for clamping a tree and blade means for shearing the tree, the improvement comprising a box frame having horizontally spaced normally upright side members and several cross members spaced lengthwise of, extending between and rigidly connecting said side members, means mounting the grapple means on at least two of said cross members between said side members, and means mounting said blade means on at least two of said cross members between said side members.

2. In the support structure defined in claim 1, the grapple-mounting means pivotally mounting the grapple means on cross members and including an upright pivot shaft extending through at least two cross members.

3. In the support structure defined in claim 1 or 2, the blade-mounting means pivotally mounting the blade means and including a pivot shaft extending lengthwise of the frame through at least two cross members.

4. In the support structure defined in claim 1, the side members being parallel.

5. In the support structure defined in claim 1, the side members being elongated plates.

6. In the support structure defined in claim 5, the broad faces of the side members being generally parallel to the length of the tractor.

7. In the support structure defined in claim 1, 5 or 6, the cross members being elongated plates having their broad faces normally disposed generally parallel to the length of the tractor.

8. In the support structure defined in claim 1, the box frame including at least four cross members.

9. In the support structure defined in claim 1, the side members and the cross members being in orthogonal relationship and forming a rectangular box frame.

10. In the support structure defined in claim 1 or 9, the side members being spaced apart laterally of the tractor a distance substantially equal to the width of the tractor chassis.

11. A tree shear comprising:
a tractor;
linkage means projecting from said tractor;
a normally upright box frame carried by said linkage means for forward and rearward tilting, said box frame including two parallel side members spaced laterally of said tractor a distance substantially equal to the width of the tractor chassis and at least four cross members spaced lengthwise of, extending substantially perpendicularly between and rigidly connecting said side members, said side members and said cross members being elongated plates having their broad faces normally disposed generally parallel to the length of said tractor;
two grapple means for clamping a tree, each of said grapple means including at least two grapple arms, a sleeve carrying said grapple arms and gussets each extending between said sleeve and one of said grapple arms;
two grapple pivot shafts each carried by at least two of said cross members and extending generally parallel to said side members, said two pivot shafts being received in said grapple means sleeves, respectively, for pivotally mounting said grapple means on said box frame;
two blade means for shearing the tree;
means for mounting said blade means on at least two of said cross members below said grapple means; and
jack means for swinging said grapple means to clamp the tree and said blade means to sever the tree.

* * * * *